US011651044B2

(12) United States Patent
Maheshwari et al.

(10) Patent No.: US 11,651,044 B2
(45) Date of Patent: May 16, 2023

(54) INTELLIGENT INSIGHT SYSTEM AND METHOD FOR FACILITATING PARTICIPANT INVOLVEMENT

(71) Applicant: Accenture Global Solutions Limited, Dublin (IE)

(72) Inventors: Vishal Brijnarain Maheshwari, Navi Mumbai (IN); Richa Gupta, Pune (IN); Vaishali Gupta, Thane West (IN); Vivek Sivaraman, Bengaluru (IN)

(73) Assignee: Accenture Global Solutions Limited, Dublin (IE)

( * ) Notice: Subject to any disclaimer, the term of this patent is extended or adjusted under 35 U.S.C. 154(b) by 635 days.

(21) Appl. No.: 16/557,666

(22) Filed: Aug. 30, 2019

(65) Prior Publication Data

US 2021/0064680 A1 Mar. 4, 2021

(51) Int. Cl.
| | |
|---|---|
| *G06F 16/683* | (2019.01) |
| *G06F 16/9535* | (2019.01) |
| *G06F 16/9538* | (2019.01) |
| *G10L 15/22* | (2006.01) |
| *G10L 25/63* | (2013.01) |
| *G10L 21/14* | (2013.01) |
| *G10L 25/78* | (2013.01) |
| *G06Q 50/26* | (2012.01) |

(52) U.S. Cl.
CPC ........ *G06F 16/9535* (2019.01); *G06F 16/683* (2019.01); *G06F 16/9538* (2019.01); *G10L 15/22* (2013.01); *G10L 21/14* (2013.01); *G10L 25/63* (2013.01); *G10L 25/78* (2013.01); *G06Q 50/26* (2013.01)

(58) Field of Classification Search
CPC ............... G06F 16/9535; G06F 16/683; G06F 16/9538; G10L 15/22; G10L 21/14; G10L 25/63; G10L 25/78; G06Q 50/26
USPC .......................................................... 707/769
See application file for complete search history.

(56) References Cited

U.S. PATENT DOCUMENTS

| | | | |
|---|---|---|---|
| 10,685,669 B1* | 6/2020 | Lan ...................... G10L 15/1822 |
| 2006/0242233 A1* | 10/2006 | Lyle ........................ G06Q 10/10 709/204 |
| 2013/0226039 A1* | 8/2013 | Shani ...................... G16H 40/63 600/595 |
| 2016/0147946 A1* | 5/2016 | Von Reden ............ G16H 10/60 705/3 |
| 2016/0189558 A1* | 6/2016 | McGann .................. G09B 5/06 434/219 |
| 2017/0084295 A1* | 3/2017 | Tsiartas .................... G10L 17/08 |
| 2017/0279862 A1* | 9/2017 | Bader-Natal ........ G06F 3/04842 |
| 2017/0300499 A1* | 10/2017 | Lev-Tov ................. G06F 16/34 |

(Continued)

*Primary Examiner* — Amy Ng
*Assistant Examiner* — Antonio J Caiado
(74) *Attorney, Agent, or Firm* — Plumsea Law Group, LLC

(57) ABSTRACT

A system and method for improving outcomes in various person-to-person goal-oriented interactions is disclosed. Specifically, the method and system enable intelligent insights and recommendations to be presented to a facilitator of the interaction via a virtual assistant user interface. When the facilitator seeks to produce a specific goal with respect to the participant, the system can be configured to automatically generate, based on a series of inputs about the participant and previous interactions, intelligent recommendations that have a high likelihood of successfully promoting the target goal in the current scenario.

20 Claims, 8 Drawing Sheets

(56) References Cited

U.S. PATENT DOCUMENTS

| | | | | |
|---|---|---|---|---|
| 2018/0165612 | A1* | 6/2018 | Saxena | G06Q 10/0631 |
| 2018/0329982 | A1* | 11/2018 | Patel | G06F 40/274 |
| 2018/0365779 | A1* | 12/2018 | Hodge | G06Q 50/26 |
| 2018/0366118 | A1* | 12/2018 | Lovitt | G10L 15/22 |
| 2019/0130904 | A1* | 5/2019 | Homma | G06N 3/02 |
| 2019/0156921 | A1* | 5/2019 | Kohli | G06N 20/00 |
| 2019/0266611 | A1* | 8/2019 | de Sousa Moura | G06N 3/08 |
| 2019/0279619 | A1* | 9/2019 | Krasadakis | G06F 40/30 |
| 2020/0152314 | A1* | 5/2020 | Scherer | G06F 16/90332 |
| 2020/0193264 | A1* | 6/2020 | Zavesky | G06N 20/00 |
| 2020/0387550 | A1* | 12/2020 | Cappetta | H04L 51/02 |
| 2021/0233652 | A1* | 7/2021 | Owen | H04L 12/1831 |
| 2022/0078139 | A1* | 3/2022 | Sreenivasan | G16H 80/00 |
| 2022/0230653 | A1* | 7/2022 | Binder | G06F 3/167 |

* cited by examiner

INTELLIGENT INSIGHT SYSTEM AND METHOD FOR FACILITATING PARTICIPANT INVOLVEMENT

TECHNICAL FIELD

The present disclosure generally relates to the generation of automated intelligent guidance. More specifically, the present disclosure generally relates to a system and method for processing audio and other input about a user and providing a recommended course of action based on the inputted information.

BACKGROUND

The functionality provided by today's electronic devices is increasing rapidly, as many consumer devices, such as smartphones, tablets, laptops, and other devices are able to run software applications to perform various tasks and provide different types of information. An intelligent automated assistant, also referred to herein as a virtual assistant, can provide an improved interface between a human and computer. Such an assistant allows users to interact with a device or system using natural language, in spoken and/or text forms. For example, a virtual assistant can be configured as an easy-to-use interface that receives and interprets user inputs, operationalizes the user's intent into tasks and parameters to those tasks, executes services to support those tasks, and produces output that is intelligible to the user.

The capacity of a virtual assistant to be able to respond to a client query, and the extent to which the response adequately and appropriately resolves a query, often depends on the knowledge base and programmed competences of the virtual assistant. In particular, virtual assistants generally operate by applying programmed rules when responding to user queries. These rules determine the scope of queries that may be addressed by the virtual assistant, and the depth of the response that is provided.

While the presence of virtual assistants in society is growing rapidly, its functionality remains limited, particularly in social service contexts. Virtual assistants may attempt to provide a response that has little to no appreciation for the emotional or other 'special' context of a situation. Without this context, the responses provided by an automated system will be limited and fail to address what is known as the 'human factor'.

There is a need in the art for a system and method that addresses the shortcomings discussed above.

SUMMARY

In one aspect, the disclosure provides a method of providing intelligent recommendations to a facilitator for fostering involvement by a participant in an activity session. The method includes a step of receiving, at a computing device and during a first activity session, a first session dataset including both personal information about a first participant, and contextual information about a first scenario associated with the first participant that includes a scenario type. The method also includes accessing a session database, the session database including a plurality of records, where each record includes personal information about a previous participant of an activity session, contextual information about a scenario associated with said previous participant, and an outcome indication for their activity session. In addition, the method includes automatically composing a first query that includes at least the scenario type of the first scenario and a positive outcome indication, and automatically executing the first query against the plurality of records. The method also includes identifying, based on the first query, first resultant records that include at least a similar scenario type and a positive outcome indication, determining at least a first approach most often associated with the first resultant records, and presenting, via a display associated with the computing device, a first message describing the first approach.

In another aspect, the disclosure provides a method of providing guidance to a facilitator based on an emotional assessment of a participant during an activity session. The method includes receiving, at a computing device, an audio recording of one or more utterances spoken by a current participant during an activity session, and detecting a speech signal in the audio recording corresponding to the one or more utterances. The method further includes recognizing a first emotional state in a first segment of the speech signal based on an analysis of its acoustic characteristics, and accessing a session database. The session database includes a plurality of records, each record including an emotional assessment performed of an audio recording for a different participant during a previous activity session and an outcome indicator for said activity session. In addition, the method includes automatically composing a first query that includes at least the first emotional state and a positive outcome indication, and automatically executing the first query against the plurality of records. The method further includes identifying, based on the first query, first resultant records that include at least a similar emotional state and a positive outcome indication, determining at least a first approach most often associated with the first resultant records, and presenting, via a display associated with the computing device, a message describing the first approach.

In another aspect, the disclosure provides a system for providing intelligent recommendations to a facilitator for fostering involvement by a participant in an activity session. The system includes a processor and machine-readable media including instructions which, when executed by the processor, cause the processor to receive, at a computing device and during a first activity session, a first session dataset including personal information about a first participant and contextual information about a first scenario associated with the first participant that includes a scenario type. The instructions also cause the processor to access a session database, the session database including a plurality of records, where each record includes personal information about a previous participant of an activity session, contextual information about a scenario associated with said previous participant, and an outcome indication for their activity session. The instructions further cause the processor to automatically compose a first query that includes at least the scenario type of the first scenario and a positive outcome indication and then to automatically execute the first query against the plurality of records. In addition, the instructions cause the processor to identify, based on the first query, first resultant records that include at least a similar scenario type and a positive outcome indication, determine at least a first approach most often associated with the first resultant records, and present, via a display associated with the computing device, a first message describing the first approach.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide a method and system to improve outcomes in various person-to-person goal-oriented interactions. Specifically, the method and system enable intelligent insights and recommendations to be presented to a facilitator of an interaction (also referred to herein as an "activity session") via a virtual assistant user interface. The facilitator may be seeking to produce a specific goal with respect to the person currently participating in the interaction (the "participant"). Based on a series of inputs about the participant and information about the interaction context and/or desired goal, as well as data describing previous interactions, the system will generate intelligent recommendations that have a high likelihood of successfully promoting the target goal.

Figure 1:
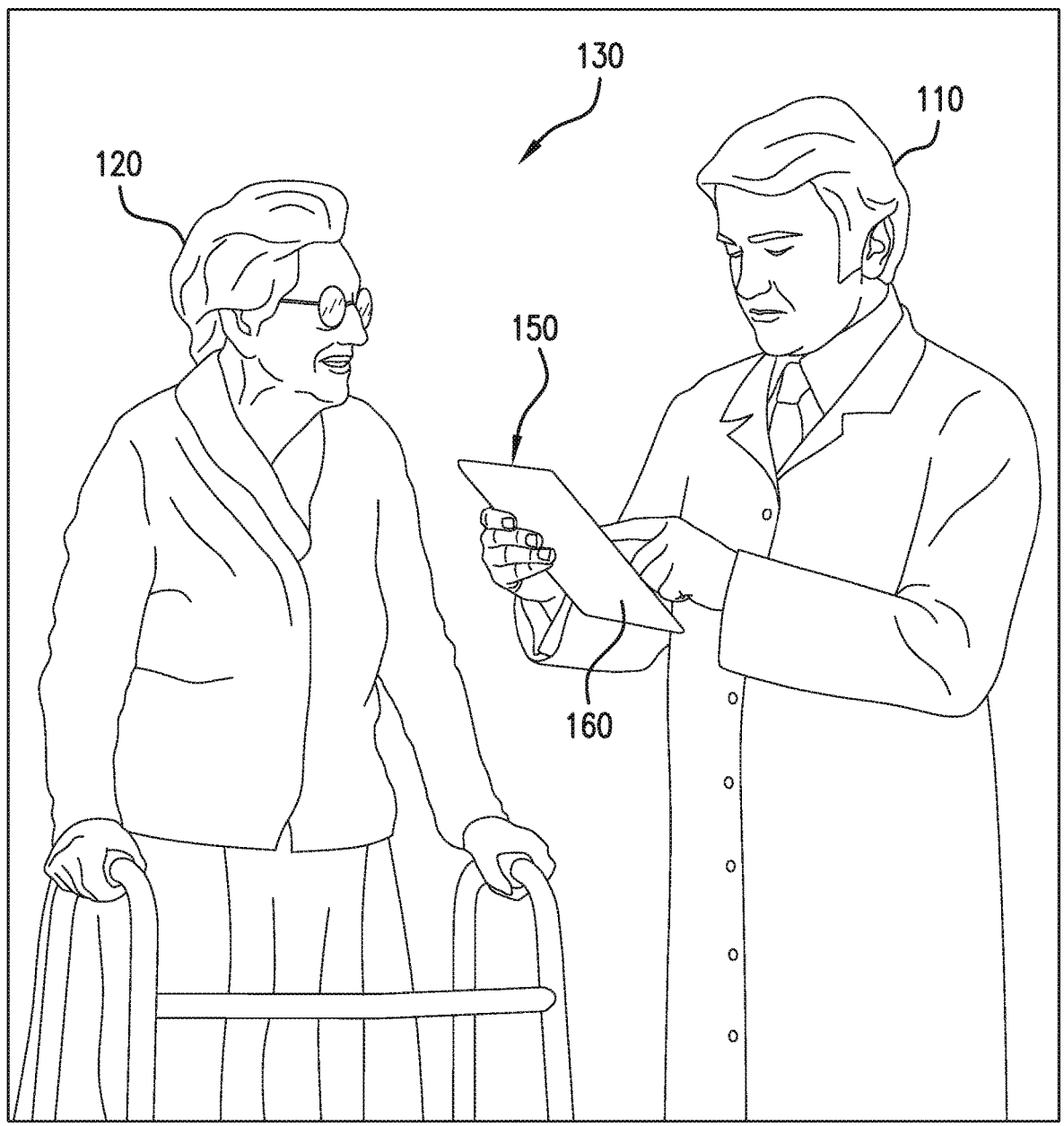
FIG. 1 illustrates a health care facilitator during an activity session with a patient participant, according to an embodiment.

In order to introduce the reader to some of the proposed embodiments, FIG. 1 illustrates an example of a first facilitator 110 interacting with a first participant 120 during a first activity session 130. In this case, the first facilitator 110 is a health care provider and the first participant 120 is a patient receiving services and care in connection with the health care provider or facility. The activity session of FIG. 1 may be understood to represent a managed health care meeting between the participant and the facilitator with a target goal of ensuring that the first participant 120 understands the information being presented regarding his medications and recurring therapy schedule, and strictly adheres to the treatment regimen being conveyed to him.

During the first activity session 130, the first facilitator 110 can access a virtual assistant ("VA") via a VA interface 150 presented on a first computing device 160. In different embodiments, the VA interface 150 is configured to present various cues, queries, or messages to an end-user for improving the interaction process. For example, in FIG. 1, the first facilitator 110 may be performing a health intake assessment of first participant 120. During this activity session, the first facilitator 110 (and/or other persons working with first facilitator 110) can talk with patients and/or their families, determining their needs, their medical history, physical and mental state, and special requirements. Understanding these needs helps the facilitator determine what services the facility needs to provide and guides patients to the right areas and treatment.

As will be discussed in greater detail below, in different embodiments, the VA interface 150 can be configured to offer various guidance, recommendations, and insights that can improve the quality of the interaction as well as increase the likelihood of a successful outcome for the participant's involvement. In some embodiments, a machine learning model can be implemented to generate such recommendations, whereby the data provided to the model is analyzed and can over time automate predictive model building to allow computer devices to discover insights without being explicitly programmed. Using automated and iterative algorithms, computing devices may employ machine learning to find high-order interactions and patterns within data. Such interactions patterns may be used to proactively identify and predict issues and solutions using information extracted from large amounts of data.

In this example, the first facilitator 110 is seeking to ensure compliance to a specific treatment regimen by the first participant 120. The first facilitator 110 asks the first participant 120 a series of questions. As the first participant 120 responds, the information is inputted into the VA system, along with any other data the first facilitator 110 (or the VA system) has deemed to be relevant. In some embodiments, an audio recording of some portion of the interaction may also be provided to the VA system, allowing the VA system to perform voice recognition on the audio and/or emotion analysis. This information can be presented to the first facilitator 110 to better guide the intake activity session and/or be used by the system (along with other inputs about the participant and the goal context) to help intelligently determine which strategies should be presented to the facilitator to promote the desired target goal.

For purposes of this application, a facilitator is one who is authorized or otherwise able to access the virtual assistant system that is configured to provide intelligent recommendations during an activity session. The facilitator may be a member or employee of a government organization or social services agency, or be an independent end-user who has a particular target goal in mind with respect to another individual or group. As some non-limiting examples, facilitators may be doctors, nurses, medical staff, therapists, office staff, counselors, teachers, police officers, investigators, lawyers, legal assistants, social workers, intake specialists, interviewers, advertisers or promoters of a product or service, or other such persons. A facilitator may be one who regularly engages in a particular type or types of activity session, or is only performing the role for a limited duration.

For purposes of this application, an activity session is an interaction, interview, survey, and/or conversation between two or more persons in which information about one person is shared with the VA to promote a specific outcome. The activity session may represent a wide range of interactions between a facilitator and a participant, including but not limited to medical or health care management, personal or social welfare, education, law enforcement, family, legal aid, or one of many other social services, as well as retail or consumer types of interactions, and/or personal interactions.

Furthermore, a participant is one about whom information is being received by the system during the activity session. A participant may be receiving services or goods (e.g., via a facilitator's assistance), or may be otherwise providing or contributing to an undertaking, enterprise, or other effort that is being supported or processed by the facilitator. The participant may be someone who has been specifically selected due to the context of the activity session, such as a witness to a crime or other event who is being interviewed to procure evidence. In other cases, the participant may be one who is selected due to personal characteristics, such as particular demographic or other physical attributes. However, in other cases, the participant may be anyone being questioned by a facilitator while using the VA assistant. In addition, in some embodiments, the participant may be someone who has special needs that may qualify for one or more assistive options that can be suggested by the VA system.

In addition, a virtual assistant may also be referred to as a virtual assistant system, a digital assistant, a digital assistant system, a digital personal assistant, and/or an automated agent. As a general matter, such terms should be understood to encompass a processing environment that is adapted to utilize spoken cues from utterances spoken in session to influence a render state for an interface serving as an activity session assistant. Thus, some or all of the processing environment may be referred to as, included in, and/or include the virtual assistant. Furthermore, a virtual assistant and associated systems for communicating with a virtual assistant may include one or more user devices, such as a computer, a server, a database, and a network. For example, a virtual assistant running on a server could communicate with a user over a network. In some embodiments, the network may be a wide area network ("WAN"), e.g., the Internet. In other embodiments, the network may be a local area network ("LAN"). For example, in a more remote location far from a metropolitan area, the Internet may not be available. In yet other embodiments, the network may be a combination of a WAN and a LAN. In embodiments where a user talks to a virtual assistant using a phone (e.g., a landline or a cell phone), the communication may pass through a telecom network and/or a wide area network. In addition, one or more resources of a virtual assistant may be run on one or more servers. Each server may be a single computer, the partial computing resources of a single computer, a plurality of computers communicating with one another, or a network of remote servers (e.g., cloud). The one or more servers can house local databases and/or communicate with one or more external databases.

In different embodiments, the VA may be accessed via a user interface for the VA system. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In different embodiments, the VA system can be configured to generate an intelligent recommendation based on the type of activity session, the personal characteristics and/or demographic factors of the participant including any special needs, audio recordings and any resultant emotional analyses, the desired outcome ("target goal"), and/or the scenario context. Personal characteristics generally refer to distinguishing qualities or attributes of an individual, and can include habitual patterns of behavior, temperament and emotion, as well as skills. Demographic factors generally refer to the various socioeconomic characteristics of a person, such as age, sex, address and/or neighborhood, education level, income level, class, marital status, occupation, religion, birth rate, death rate, average size of a family, and/or average age at marriage. Individuals with special needs typically require assistance for disabilities that may be medical, mental, or psychological, and/or a condition that causes an individual to require or qualify for additional or specialized services or accommodations. For example, persons with special needs may include racial or ethnic minorities, children, victims of specific types of crimes, the elderly, socioeconomically disadvantaged, underinsured, those with certain medical conditions, or those for whom access to education or other resources are limited.

The "scenario context" refers to the type of interaction that is occurring, the general goals of the interview, the basis on which the participant was selected, and/or the events leading up to the current activity session. Some non-limiting example scenarios include physical and psychological therapy or counseling, medical intake sessions, witness interviews, and/or promotion of a cause, endeavor, service, or product. A target goal is usually identified or selected by the facilitator (or by the organization with which the facilitator is associated) and can refer to a specific outcome that is desired during or as a result of the interaction. For example, target goals can include patient adherence to a protocol, agreement to purchase or use a service or product, willingness of a witness to attend a trial, donation of money to an organization, use of a resource by the participant, action taken by the participant to ensure resolution of some conflict or social need, or any other desired outcome.

The VA system can access a legacy repository ("knowledge base") in which records for previous participants are stored in order to determine an approach that is best suited to the current situation. In some embodiments, the system may be configured to select one or more strategies that have a likelihood of incentivizing the participant to behave in a particular way or increase the level of engagement with the facilitator. For example, the system may identify one or more educational, encouraging, motivational, or inspirational messages that can provide specific knowledge or persuasive logic or rationales that, when shared with or applied to a participant, is known to increase participant compliance with the target goal. In another example, the system may identify one or more measures, support, or resources that may be proffered or otherwise made available to the participant and can serve as a vehicle(s) for encouraging and promoting a commitment or investment of the participant to the process goal(s).

Figure 2:
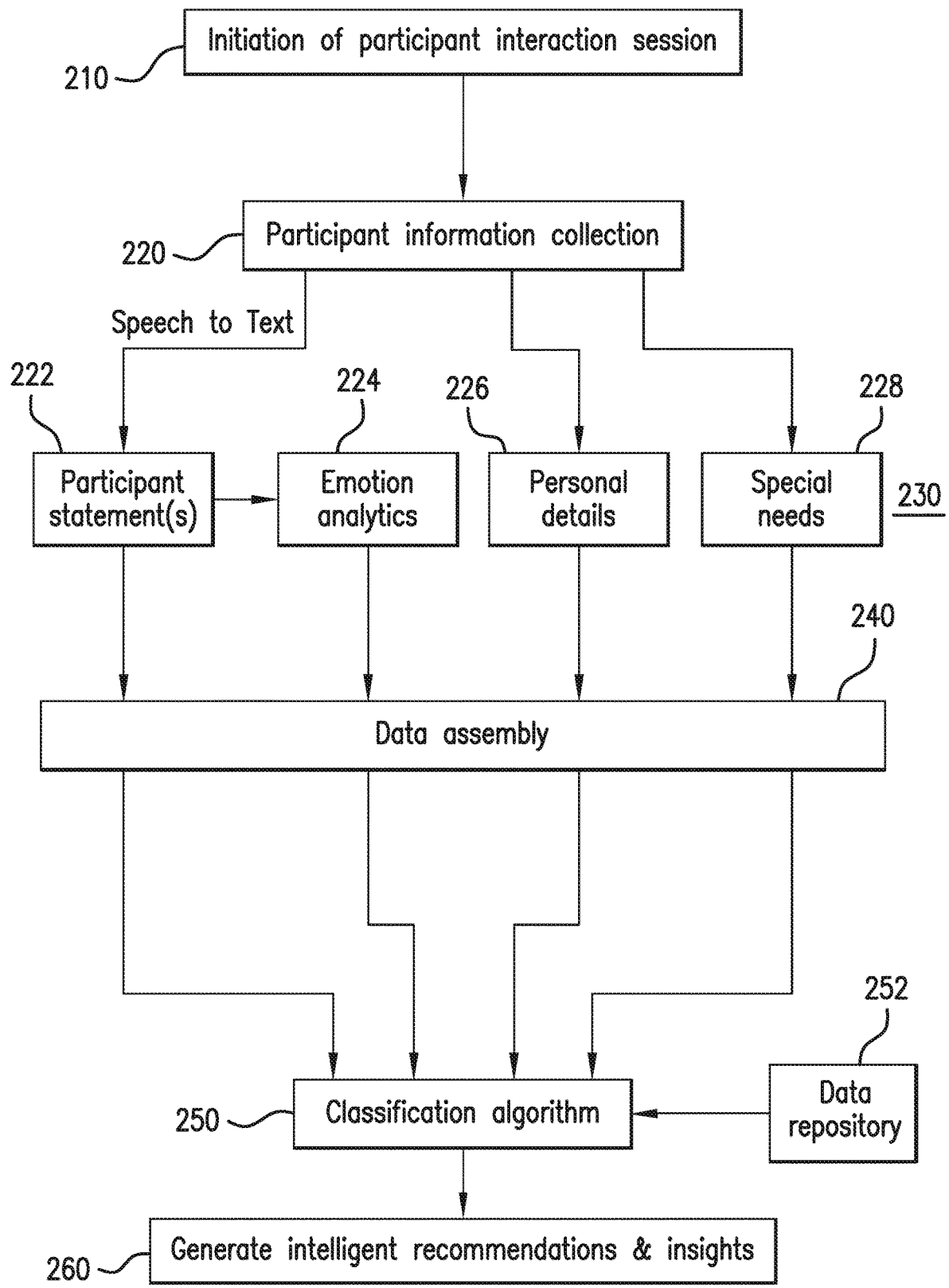
FIG. 2 is a schematic flow diagram of an embodiment of a process of generating intelligent recommendations during an activity session.

In FIG. 2, a flow chart depicting an overview of a process of generating intelligent recommendations is shown. In a first stage 210, a facilitator can initiate a conversation or other interaction ("activity session") with a participant. This can occur in-person, as well as by phone, online chat, videoconferencing, or other communication means. The facilitator can advise the participant and/or obtain consent for the information that is being collected and inputted into their system, and may possibly include an audio recording of the participant. The facilitator can ask the participant a series of questions in a third stage 230, either directly or through an extension of the virtual assistant in cases where the participant is also able to access the intake computing device or another computing device that is configured to communicate with the intake computing device. For example, the VA may display a sequence of questions designed to elicit information that can be used for generation of a recommendation. These questions can be shown directly to the participant or may be relayed by the facilitator to the participant. In some embodiments, the questions will include topics such as those noted earlier (e.g., directed to the personal characteristics and/or demographic factors of the participant), which include personal details 226 and special needs 228. In cases where an audio recording is made of a participant's statement 222 during the collection, the audio may be converted to text and stored in a text format. The audio recording may also be used during an emotion assessment and analysis 224. All of these data will be assembled in a fourth stage 240 for storage, processing, and review. In a fifth stage 250, the system will attempt to determine, based at least on previous events and corresponding outcomes available in a data repository 252, an approach that is best suited to delivering the desired outcome. In some embodiments, a classification model will be implemented in which the current data will be labeled and the scenarios most similar to the present case will be sought in order to develop the most reliable strategy. In a sixth stage 260, the system will generate one or more recommendations and/or insights and present them to the facilitator.

Figure 3:
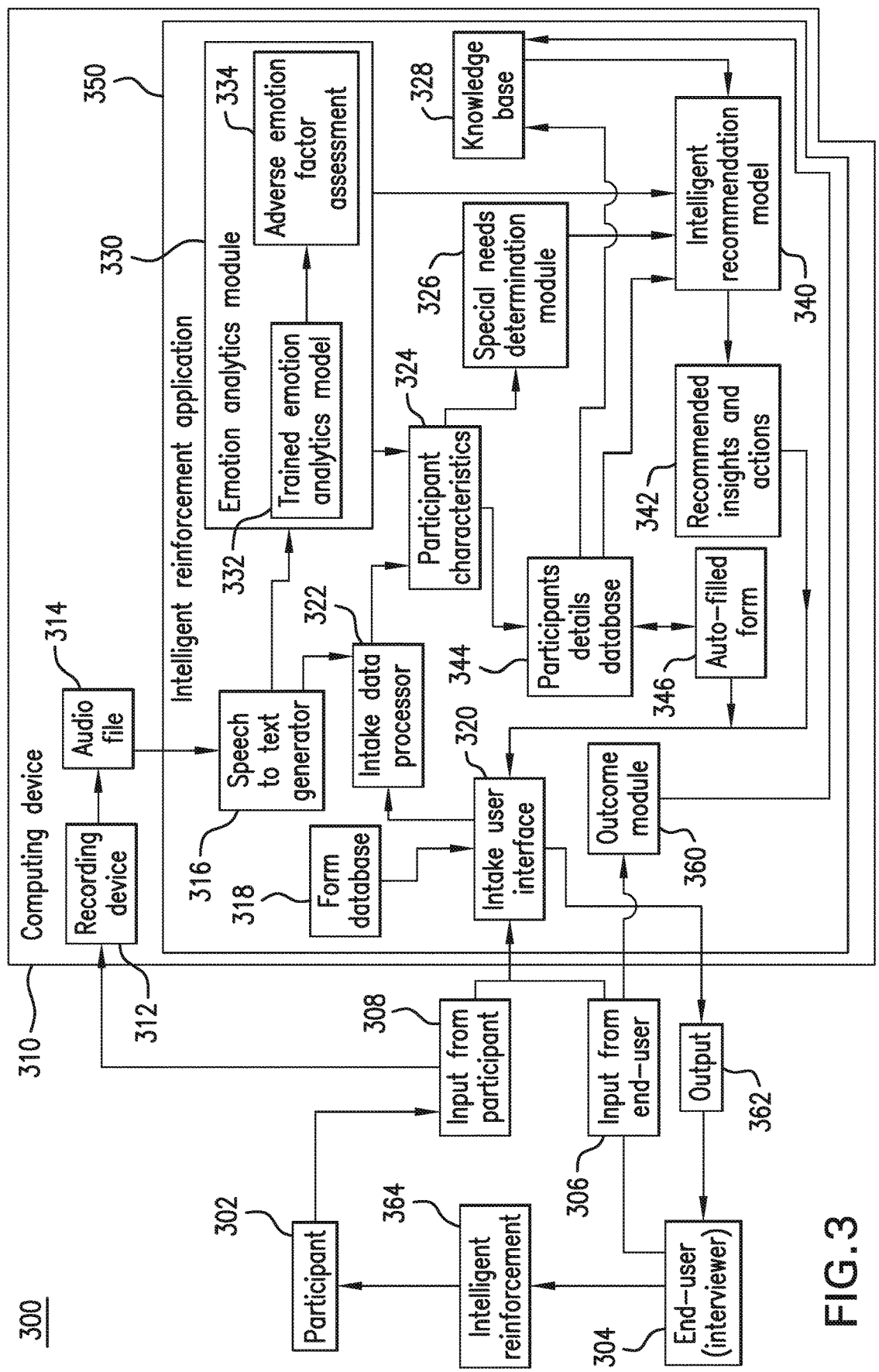
FIG. 3 is a schematic diagram of an embodiment of an intelligent recommendation virtual assistant system.

Referring now to FIG. 3, a schematic diagram representing the architecture of one embodiment of a virtual assistant system ("system") 300 for generation of intelligent recommendations is illustrated. In this diagram, a facilitator is an end-user 304 of a computing device 310 on which an intelligent reinforcement application ("application") 350 is being accessed. The computing device 310 could be a tablet computer, a smartphone, a laptop computer, a desktop computer, or another type of computing device. The computing device 310 includes a display (in some cases a touchscreen display) that provides a viewing mechanism for the user. In some examples, a user could interact with the virtual assistant using a program run on a laptop computer, such as a text-based chat program, a voice-based communication program, and/or a video-based communication program.

Although not shown in FIG. 3, in different embodiments, because the application 350 may access sensitive and/or confidential information, the application 350 may require high-level authentication such as facial recognition or other biometric security tokens to permit access. For example, an organization may wish to increase or supplement the security process through which the login of a user occurs. In some cases, login can occur following single-factor authentication (SFA), where the user only presents an identification badge or token such as a password in order to obtain access to the system. However, in many cases, additional steps or inputs may be required to better protect both the user's credentials and the resources the user can access. As one example, two-factor authentication (2FA), sometimes referred to as two-step verification or dual factor authentication, may be incorporated by the system to verify user identities. Two-factor authentication often provides a higher level of assurance than authentication methods that depend on SFA. For example, the system can include a 2FA process whereby users provide a first factor as well as a second factor. These factors can comprise possession factors or a security token (i.e., connected, disconnected, or contactless tokens), knowledge factors such as a password, and/or inherence or biometric factors such as an eye scan, fingerprint, or facial recognition scan. Two-factor authentication adds an additional layer of security to the authentication process, which can decrease the likelihood of unauthorized users gaining access to an organization's devices or user accounts, because in such cases possession of the security token alone is not enough to pass the authentication check.

Following a successful login to the system, the end-user 304 may initially or at some point during the activity session request access to a specific form type that includes the desired data input fields and/or corresponds to the form for the specific scenario context and/or activity session type. For example, a pre-prepared form may have been created, stored in, or otherwise provided to a form database 318 of application 350. Prior to or after the end-user 304 initiates an interview with a participant 302, the end-user 304 can launch or otherwise be presented with an intake user interface ("interface") 320 (e.g., on a display of the computing device 310) for viewing these forms. The interface 320 can also be configured to receive input from the end-user as well as present output. The interface 320 may therefore be capable of converting inputs from other systems into text, speech, and/or other kinds of expressions (such as modulated speech, emoticons, etc.). In some embodiments, the primary appearance of the virtual assistant may be 'viewed' by a user as the interface 320.

In some embodiments, via the interface 320, the application 350 can be configured to automatically offer an end-user access to one or more forms that are more commonly requested or used by the end-user and/or the organization of which the end-user is a representative. In another embodiment, the end-user may be able to enter the scenario type and/or the context or other search term and be shown forms that correspond to or have been used in the past with the designated context, allowing the end-user to readily identify the form that is best-suited to the current activity session. The forms stored in form database 318 can be updated or modified as needed, and can include one or more blank templates in cases where an end-user wishes to custom generate a particular type of form. In some embodiments, the application 350 may be in communication with a cloud service via a network connection from which updated forms and other information may be received or shared.

As the participant 302 begins to respond to various queries from the end-user 304, the end-user 304 can enter the information into the intake user interface 320 as an input from end-user 306. Such input may also occur as the end-user makes observations, assessments, comments, or other notes during the activity session that he or she enters directly into the interface 320, as well as scenario details and session context. In one embodiment, the interface 320 can also ask the facilitator to provide one or more inputs about themselves that have been known to affect interactions with participants, such as age, gender, experience, ethnicity, or other aspects that may influence a participant's willingness to engage in the session. Furthermore, the facilitator may provide information establishing the desired outcome for the session, either by directly identifying or selecting the target goal, or by selection of a specific form type that is associated with a particular outcome.

In some cases, the participant 302 may also or alternatively submit their responses directly to the computing device 310 as input from participant 308. For example, the participant may directly interact with and provide response to the interface 320 and/or an extension of the interface 320 on a different display. As another example, as noted earlier, an audio recording of a statement made by the participant 302 can be provided to the computing device 310. In some embodiments, the computing device 310 includes a recording device 312 configured to initiate recording in response to a command received through the intake user interface 320 and provide an audio file 314 to the application 350. In another embodiment, the recording can occur independently, for example at another device, and resulting audio file 314 may be transferred to the computing device 310, or be otherwise shared with the application 350, for example, via a network connection. In some embodiments, the audio file 314 can be received by a speech to text generator 316 configured to convert the audio to a text file.

An intake data processor 322 is configured to receive the various inputs, including the input from participant 308, input from end-user 306, audio file 314, and/or any text file generated by the speech to text generator 316. The intake data processor 322 can process and organize the data per preestablished rules and classifications in order to determine what type of information is known, whether the information falls within an expected range or value, if there are any inconsistencies in the data, and/or if any additional information, clarification, or follow-up should be addressed during this activity session. Participant characteristics and contextual data 324 are stored in a participant details database 344. Although not shown in FIG. 3, any information about the facilitator conducting the session can also be shared and stored in participant details database 344. In some embodiments, the participant characteristics and contextual data 324 may also be conveyed to a special needs determination module 326 to determine whether the current participant qualifies for one or more accommodations or incentive programs that may be offered in this type of scenario. The resultant determination, along with participant characteristics and contextual data 324, can then be received by an intelligent recommendation model ("model") 340.

In some embodiments, additional types of data may also be received by model 340. In FIG. 3, an emotion analysis module 330 is configured to analyze the audio file 314 and any particular terms detected in the speech text file via a trained emotion analytics model 332, which will be discussed in greater detail below with respect to FIG. 4. The output of the emotion analytics model 332 is sent to an adverse emotion factor assessment module 334 to determine whether the emotions identified by the emotion analytics module 334 are associated with a likelihood of adversely affecting the desired outcome of the session. This assessment is then shared with the model 340. The output of the emotion analytics model 332 is also shared as a facet of participant characteristics 324 for storage in participant details database 344. In some embodiments, this information can be automatically processed and presented to the end-user 304 or presented at the request of the end-user 304 as a form of guidance and reference during the activity session (see FIG. 6).

Once the model 340 receives the aforementioned inputs about the current participant and context, the model 340 may further access a knowledge base 328 (also referred to herein as a "session database"). The knowledge base 328 may be understood to refer to a repository of data about previous participants and activity sessions. The knowledge base 328 includes a plurality of records, where each record is associated with one specific participant and their one or more activity sessions, and/or each record is associated with information obtained for one particular activity session. These sessions may have been conducted with the guidance of the VA system, or may have occurred independently, where the collected information was later inputted and stored as a new record (or update to a previous record) in the knowledge base 328. Each of the records can be understood to include data similar to that described above with respect to participant characteristics and scenario and session contexts for previous activity sessions.

Furthermore, the generation of a text file following an audio recording of a participant's spoken statement(s) can provide a great deal of data that is unstructured. These word files will include a variety of words or phrases. In some instances, the model can be configured to connect to the repository to scan each record and extract words or phrases from each record field and text file, extract context factors, and extract existing labels. Extracted words, phrases, context, and labels can form a content dataset. Inference models use machine learning logic to form associations between words/phrases in the dataset that were extracted from particular records.

In some implementations, example text conversion algorithms can be executed to extract one or more data elements. For example, a term frequency-inverse document frequency (TFIDF) algorithm can be executed by computing device 310 or a server associated with the system to determine how important a particular word is in a record. In some implementations, the TFIDF algorithm is used to detect or determine important words associated with a text file's content.

In some embodiments, the TFIDF algorithm can be used to describe or determine how significant a particular word is for a generated label. In some instances, a server can scan the text and detect or identify a particular word that appears relatively often within the statement. The particular word, and the associated frequency with which the word appears in other statements, may be important for determining the state, value, and or motivations of the participant. Thus, multiple distinct word occurrences across multiple records may be combined to generate an accurate classification model and/or to iteratively update a generated first classification model to produce subsequent classification models. For example, execution of the TFIDF algorithm can cause a server to consider how often a particular word appears in a single record, how often a particular word appears in other record relative to the single record; and generate an overall estimate of how important a particular word is based on the words relative occurrence within one or more relevant record. Example algorithms using TFIDF can include a Support Vector Machine (SVM) algorithm and a Center Based Similarity (CBS) algorithm.

As an example to illustrate the operation of model 340, computing device 310 can connect or already have access to an electronic repository of previous session/participant records. The records can have a wide range of session knowledge elements, including but not limited to participant characteristics such as ethnicity, age, gender, religion, sexuality, education level, literacy, disability, medical or psychological conditions, person's name, nationality, occupation, work hours or schedule, residence, session location, date, association or organizations in which they are a member, previous experiences in similar scenarios, languages spoken, marital status, availability of support from family and friends, transportation access and type, mobility, insurance status, number and age of dependents, distance from person's residence to a target goal (if a physical site), financial resources, etc. Furthermore, each record can also include information about the activity session, how the participant was selected or identified, who the interviewer was, and whether the outcome of the session was deemed successful (i.e., positive outcome), or unsuccessful (i.e., negative outcome), in some embodiments, the session outcome may not be inputted until days or weeks following the session, as the target goal may refer to results that can only be obtained at a later time.

The array of knowledge in each record can have existing labels that indicate a classification of the information, generated either by human users, such as the facilitators, or by the system. For example, some elements may have a higher security label, while some may have a sensitive personal information label. These elements can have access controls that align with the label to restrict access rights in accordance with their labels. Other labels can also be applied to facilitate the model's operation.

In different embodiments, model 340 is configured to build and train multiple machine learning classifiers, such as K-nearest neighbors (k-NNs), recurrent neural networks (RNNs) and convolutional neural networks (CNNs) or machine learning clustering such as K-means. The machine learning classifiers may extract features in records, perform processing to detect features of the records, determine record feature category and classify the records in the repository based on the record feature category. In an example, features of the records may be semantic features or descriptive features. Semantic features may be a phrase, a clause, a word or the like. Descriptive features may be the categories or tags under which the participant characteristics are arranged (e.g., race, gender, age, etc.). In an example, the system may identify similar sets of records or dissimilar sets of records based on the feature category. In another example, the system may identify records that are outliers in a set of records. Also, the system may identify the category of records that do not have enough data for machine learning to process and may result in inaccurate analysis for exclusion.

In general, K-nearest network classifiers may detect and classify features of documents based on the elements in the documents. The machine learning record processing system, according to an embodiment, provides a method for building and training k-NNs to output a classification of a record. In another example, k-means cluster grouping may detect and group features of records based on the features in the records, as noted above. In another example, CNNs include many layers to detect and classify particular features of records relevant to a current participant and/or activity session. Furthermore, each layer of the CNN typically has a multitude of parameters associated with it. The specific values of those parameters for a successful and accurate record classification may not be known. In another example, a recurrent neural network (RNN) may classify particular features of records relevant to a current participant and/or activity session.

After building a semantic feature category classifier, the semantic feature category classifier may be used to identify semantic features in records and classify records into a semantic feature category. For example, a semantic feature category may be a category that includes records with a certain phrase, a clause, a word or the like. Thus, the semantic feature category classifier determines whether the record contains a semantic feature in one of the categories for which it was trained. Similarly, a descriptive feature category classifier builder builds a structural feature category classifier. As some non-limiting examples, a descriptive feature category may include records of female participants who have children, a participant with a mobility disability, or a participant whose native language is not English, and the like. The descriptive feature category classifier can be trained to identify classes (i.e., category) of records that have similar descriptive features. The descriptive feature category classifier determines whether a record is in a class for which it was trained to identify. Also, the descriptive feature category classifier may be used in conjunction the semantic feature category generated by the semantic feature category classifier.

In some embodiments, the semantic and/or descriptive feature category classifier may use a K-nearest neighbors (k-NN) algorithm or other non-parametric method used for classification and regression. With k-NN classification, the output is a class membership such as semantic feature category or descriptive feature category. In k-NN regression, the output is the property value for the object. This value is the average of the values of its K-nearest neighbors. In another example, the semantic feature category classifier or descriptive feature category classifier may use k-means machine learning for clustering or grouping. In another example, a feature category classifier may have multiple convolutional layers, fully connected layers, and binaries sigmoidal layer. In one example, the feature category may be stored in the knowledge base 328 and may be used by the model 340 to identify similar records.

Although the classifier is described above with reference to K-NN other machine learning algorithms such as classifiers including deep learning classifiers, reinforcement learning, semi-supervised learning, cluster analysis, hierarchical clustering, association rule learning, artificial neural network, unsupervised learning, linear classifier, decision tree, Bayesian analysis, and the like. Some examples of such machine learning classifiers that may be used includes CNN, RNN including Long Short Term Memory or a combination of the classifiers. In other examples, k-means machine learning may be used to cluster or group the features of the records.

In some embodiments, the classification may be a prediction of whether the record belongs to the class or category. The prediction may be accompanied by a confidence value that indicates the accuracy of the classification. For example, a k-NN classifier trained as described may map the records to cluster centroids that are descriptively or semantically similar, and a decoder may determine the appropriate record category for a record based on mathematical operations such as distance from the centroid for the current participant and activity session in relation to other records at a similar distance from the centroid.

As records with a high level of similarity or degree of relationship with the current participant, session, and target goal are identified, a subset of those records associated with positive outcomes for the specified goal are selected. In another example, only records with a positive outcome indication will be initially searched. From the resultant subset, the most commonly implemented approach resulting in a successful outcome is determined. This approach can be incorporated into the data for the current scenario to test for inconsistencies and/or possible conflicts. If any issues appear to diminish the likelihood of success of this approach for the current participant, a next best or common approach may be used. Resultant intelligent recommended insights and actions 342 can then be automatically presented to the end-user as output 362 via the interface 320. The end-user 304 can then choose to implement or offer the suggested tool or action (intelligent reinforcement 364) to the participant 302 as an incentive to comply with the target goal. In some embodiments, the end-user may be able to disregard the first recommendation and ask the system to generate an alternative next-best option.

Furthermore, as shown in FIG. 3, the application 350 can be configured to automatically fill and generate a selected form via an auto-fill form module 346, which can also be presented to the end-user 304. For example, the application 350 can receive or access information stored about the current participant and session from the participants details database 344 to generate, prepare, and complete a desired form. In some cases, the form can be in a printable or other reader friendly format. If fields on a form remain blank toward the end of an activity session, a notification can be presented to the end-user to ensure a timely question to the participant. Thus, the intake can be readily and/or automatically transferred and/or converted to an end product that can be stored, printed, and shared as needed, greatly simplifying the paperwork and record keeping burden traditionally carried by interviewers.

It should be understood that in other implementations, computing device 310 can include additional or fewer modules and system 300 can include one or more additional computing devices or related server devices. The modules of system 300 can be associated with computing device 310 and, for example, can be disposed within computing device 310. In alternative implementations, the modules of system 300 can include independent computing devices that are coupled to, and in data communication with, computing device 310. As used in this description, the term "module" is intended to include, but is not limited to, one or more computers, processing units, or devices configured to execute one or more software programs that include program code that causes a processing device(s) or unit(s) of the computer to execute one or more functions. Processing units can include one or more processors (e.g., microprocessors or central processing units (CPUs)), graphics processing units (GPUs), application specific integrated circuits (ASICs), or a combination of different processors. In alternative embodiments, computing device 310 and modules can each include other computing resources/devices (e.g., cloud-based servers) that provide additional processing options for performing one or more of the machine learning determinations and calculations. The processing units or devices can further include one or more memory units or memory banks. In some implementations, the processing units execute programmed instructions stored in memory to cause computing device 310 and modules to perform one or more functions described herein. The memory units/banks can include one or more non-transitory machine-readable storage mediums. The non-transitory machine-readable storage medium can include solid-state memory, magnetic disk, and optical disk, a random access memory (RAM), a read-only memory (ROM), an erasable programmable read-only memory (e.g., EPROM, EEPROM, or Flash memory), or any other tangible medium capable of storing information.

Figure 4:
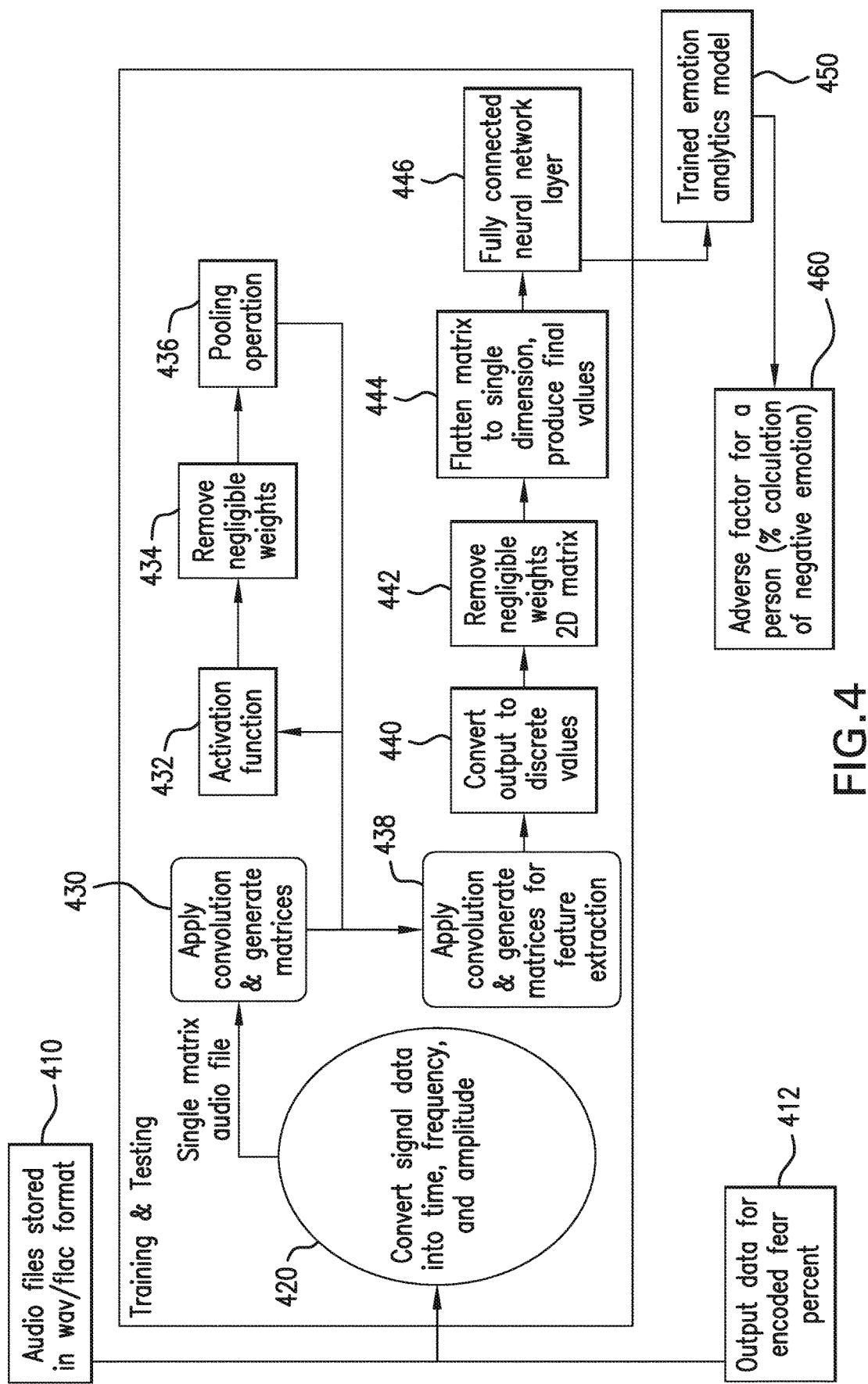
FIG. 4 is a schematic diagram of a flow of general inputs and outputs for an emotional training model, according to an embodiment.

As noted above, in different embodiments, the system 300 can also be configured to provide an assessment and/or feedback or guidance based on the detected emotional state(s) of the participant (see emotion analysis module 330). Thus, one goal of an automatic emotion recognizer is assignment of category labels that identify emotional states. In FIG. 4, an example of a process by which a participant's emotions may be determined is depicted. In FIG. 4, at a first step, speech of the user is recoded and converted into any of the audio format, which is then captured by a speech detector (i.e., a voice recognition processor). The resulting high-fidelity audio files 410 stored in .wav or .flac format (other audio file formats such as mp3, mp4, AAC, OGG, or WMA, or even video may also be used) are received by a training and testing module. In some embodiments, a parameter comprising a percentage or threshold at which an emotion is encoded (output data 412) is also submitted. In a second step 420, the received audio signal is converted into time, frequency, and amplitude (frequency wave file). The conversion may occur automatically by the speech detector, for example by application of an FFT (Fast Fourier Transform) and MFCC (Mel-frequency cepstral coefficients) to receive a normalized coefficient, usually a matrix of 128× 128. This will be the numerical input to the model, represented by a series of zeros and ones.

At a third step 430, a convolution of 40 is applied, generating 128 matrices of 40×40 that are used for feature extraction. In a fourth step 432, an input layer and activation function are applied to every element of the matrices with corresponding weights and biases. At a fifth step 434, weights that are determined to be negligible are dropped out or removed, and in a sixth step 436, a max pooling operation against a 5×5 matrix of 128 matrices is performed. A convolution of 5 is then applied to the product of these operations in a seventh step 438, generating 128 matrices of 5×5 for feature extraction. In an eighth step 440, an input layer and activation function (softmax) are applied to convert the output to discrete values. Again, weights that are determined to be negligible are dropped out or removed in a ninth step 442, leaving a two-dimensional matrix. A flattening operation is then performed in a tenth step 444, where a 5×5 matrix is operated against 1×5 identity matrices. The two-dimensional matrix is converted to a single dimension and final values of weights and biases are obtained. At an eleventh step 446, a decision layer is produced, representing a fully connected neural network layer which works on the matrix that was obtained in the previous step. The decision layer decides whether the value obtained needs a back propagation while training the model. This is used to generate a trained emotion analytics model 450, which will be used to determine the adverse factor 460 for a participant (as a percent calculation of their negative emotion).

In some embodiments, the analytics of the speech are initiated by implementation of a CNN model, for example, using a filter of 3 where the window of the CNN model is kept to 8 and the padding is set to 0. This model is then trained to identify male and female voice, tone, and emotions like anger, disgust, dismay, sadness, reluctance at different intervals. This will be used to generate a report for the facilitator that may offer hidden insights that can improve the interaction. In another embodiment, linear discriminate classification with Gaussian class-conditional probability distribution and k-nearest neighborhood methods are used to classify statements and portions thereof ("utterances"). The utterances can contain various levels of emotion expressed by the participant. The emotion can be positive, such as happiness, satisfaction, contentment, amusement, or other positive feelings of the speaker, or negative, such as anger, disappointment, resentment, irritation, or other negative feelings. In some embodiments, the emotion analysis model may make use of a reference set used for extracting features and training the back-propagation neural network model. For example, some statistics of the pitch, energy, and the speaking rate may be selected as relevant features using feature selection techniques.

Figure 5:
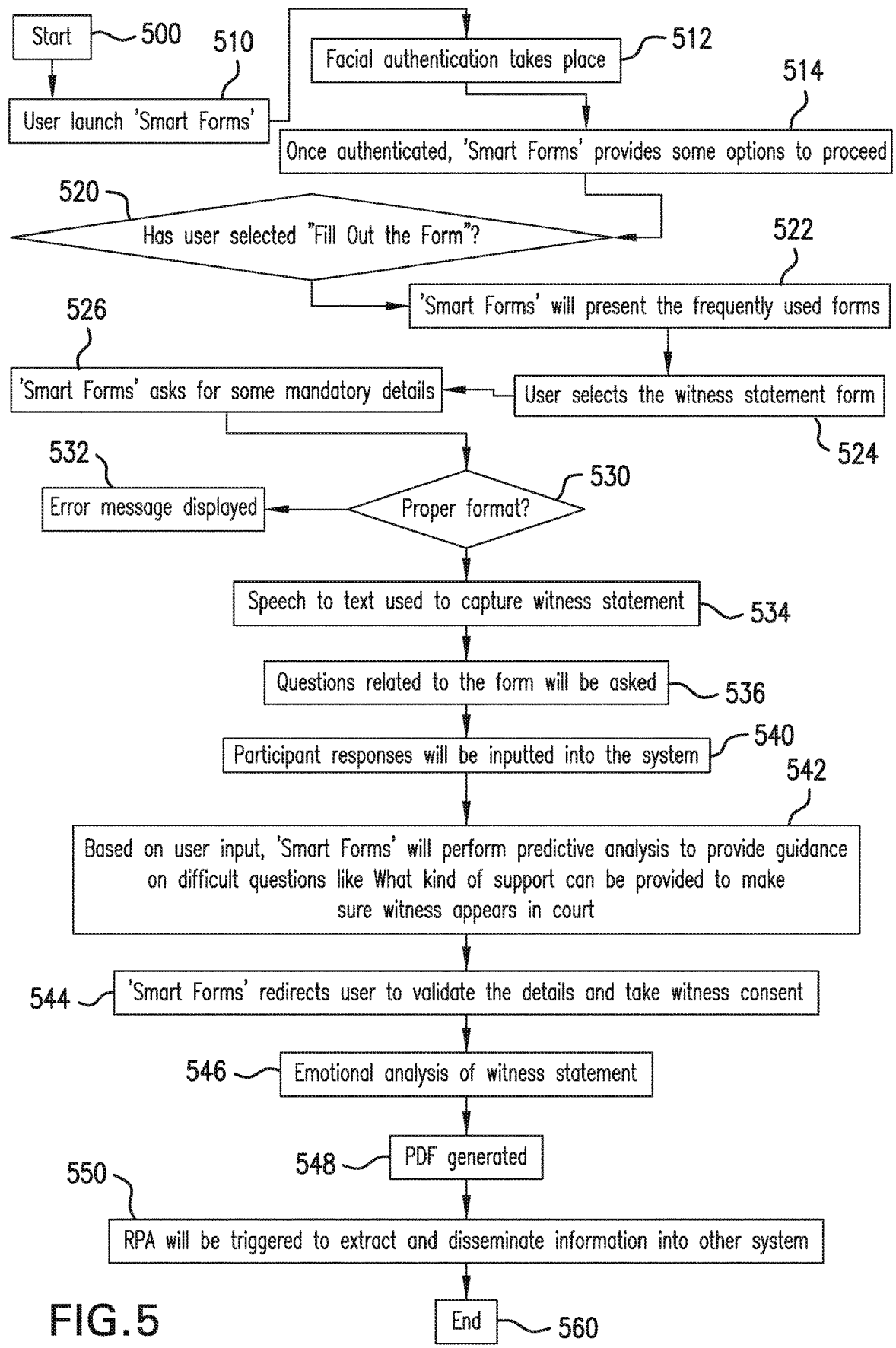
FIG. 5 is a high-level schematic diagram of a process of interacting with a virtual assistant system and receiving intelligent recommendations from the system, according to an embodiment.
Figure 6:
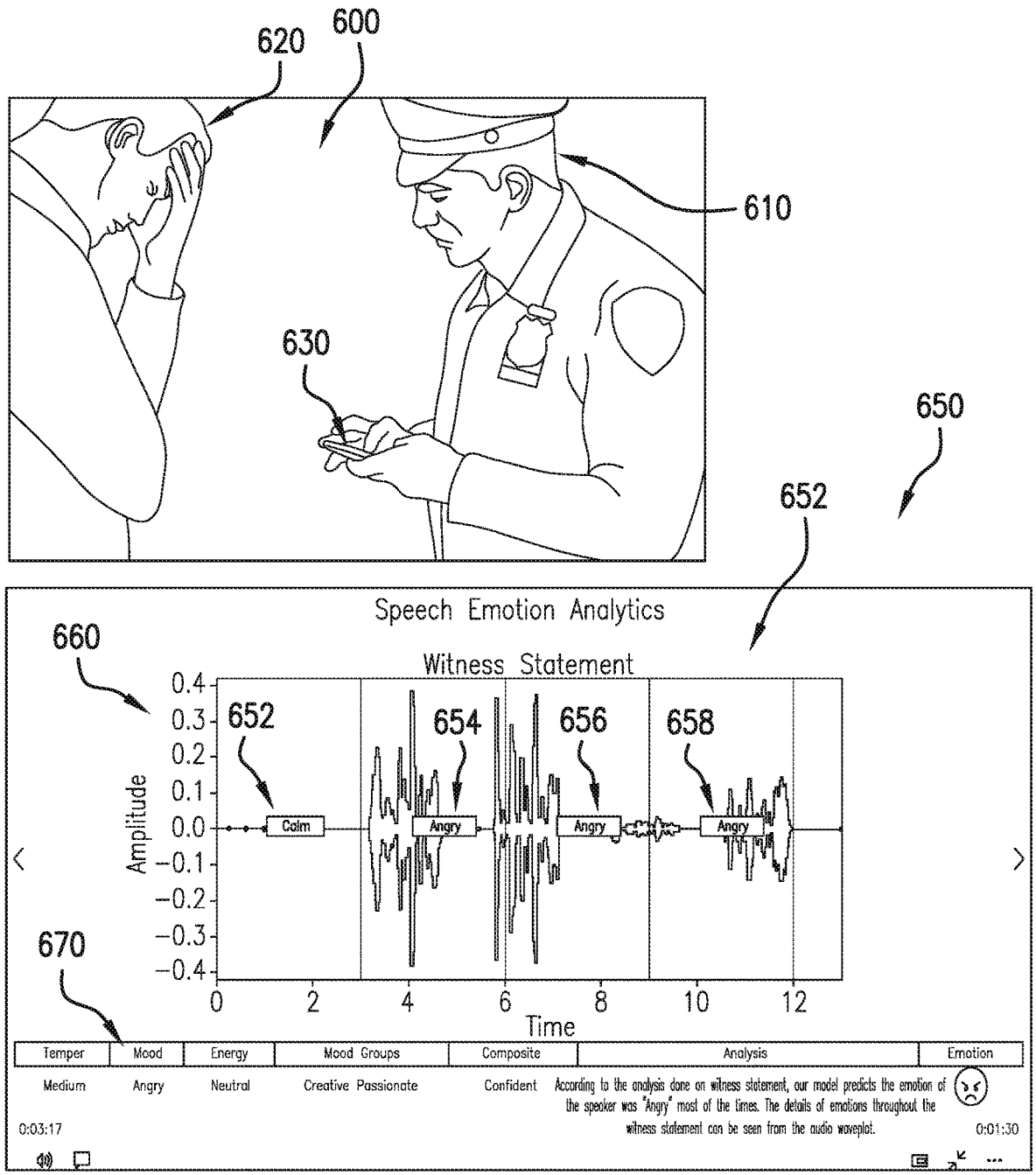
FIG. 6 illustrates a law enforcement facilitator during an activity session with a witness participant while accessing a virtual assistant that provides an emotional assessment of the participant, according to an embodiment.
Figure 7:
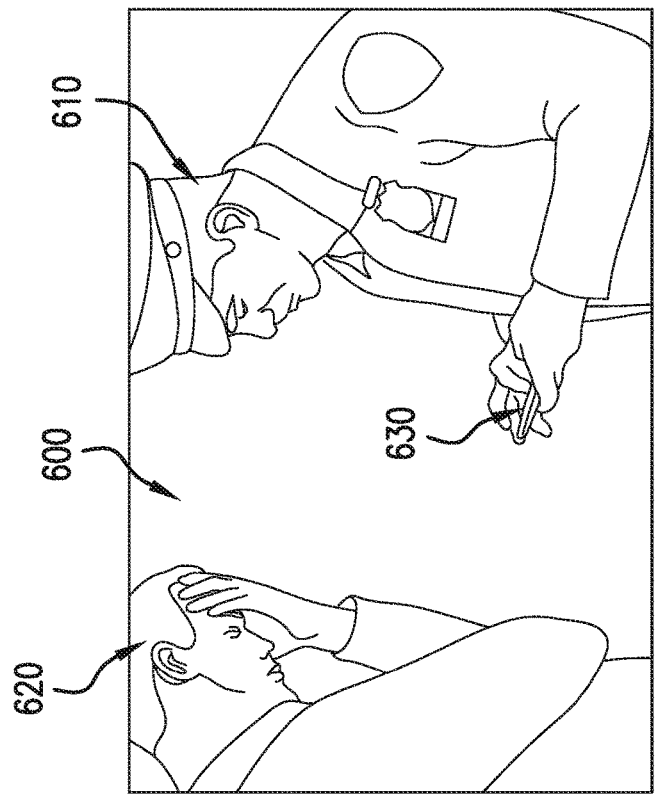
FIG. 7 illustrates the facilitator of FIG. 6 receiving an automated intelligent recommendation for implementation with the participant during the activity session, according to an embodiment.

Referring now to FIGS. 5-7, to better illustrate the benefits of the proposed systems and methods to the reader, a more specific example scenario will be discussed. In FIG. 5, a high-level flow diagram of a process of using a virtual assistant system is shown in a witness interview (activity session) context. It can be appreciated that in many countries and regions, police officers must juggle multiple priorities—from responding to crime, arresting violators, submitting incident reports, to updating a myriad of legacy systems. The officers are required to fill multiple forms based on different crime activities, placing a significant strain on an already short-staffed policing system. The traditional form filling process is highly manual, with no guidance or intelligence involved. Additionally, there is no leverage of real-time insights during the form filling process in order to aid the officer to be effective in his or her investigation.

As described herein, law enforcement communities may instead be offered a more streamlined and efficient mechanism by which to simplify the on-field information capture process. In some embodiments, the VA system is configured as a conversational interface accessed via a computing device. The intelligent system can expedite police data entry as well as provide actionable insights to the officer, such as "What kind of support would make the witness of a violent crime feel comfortable to testify in court vs deny coming to the court?" For example, many witnesses experience stress and fear during the investigation of a crime and when attending court and giving evidence. Stress can affect the quantity and quality of communication with, and by, witnesses of all ages. In addition, some witnesses may have particular difficulties attending court and giving evidence due to their age, personal circumstances, fear of intimidation or because of their particular needs. In such circumstances, where witnesses are considered to be vulnerable or intimidated, "special measures" can improve the quality of their experience by helping them to give their "best evidence". Special measures or accommodations in this scenario refer to a range of measures identified by a community that can be used to facilitate the gathering and giving of evidence by vulnerable and intimidated witnesses. These special measures can be comprised of a series of provisions that help vulnerable and intimidated witnesses give their best evidence in court and help to relieve some of the stress associated with giving evidence. Reporting a crime, giving a statement, and being called to give evidence in court can be very daunting experiences for witnesses.

However, an officer may not always appreciate the complex interplay of factors that would trigger the offer of a special measure, nor which special measure(s) would be most appropriate for a specific witness or situation. In such cases, the incorporation of the VA system into the interview process becomes highly desirable. To aid the police officer, the VA system can be configured with knowledge of the various special measures that are available in order to provide intelligent recommendations as described herein. For example, the system can receive the inputted witness data to determine whether a particular aspect of the witness is vulnerable, and/or to assess whether the witness may experience intimidation that would discourage them from testifying. Vulnerable witnesses can refer to witnesses who are children (e.g., under 18 years of age), and any witness whose quality of evidence is likely to be diminished because they are suffering from a mental disorder or have a physical disability. While some disabilities are obvious, some are hidden, and the VA system can be configured to ensure the interview covers broad facets of the witness' lifestyle to detect potential disabilities or issues. In addition, witnesses may be intimidated either from self-inflicted fear or from external sources. Victims or witnesses in sexual offenses can for example be considered intimidated, as well as those impacted by violent crimes.

In response to an assessment that the current witness would benefit or be encouraged with the offer of special measures, the system can identify one or more special measures that have been listed as being available to vulnerable and intimidated witnesses per the local community policies. Some examples of these measures include: (a) screens in the courtroom to shield the witness from the defendant, (b) a live link to enable the witness to give evidence during the trial from outside the court through a visual link to the courtroom, (c) the possibility of giving the evidence in private, thereby excluding members of the public and the press, (d) the removal of wigs and gowns by judges and/or attorneys, (e) a visual recorded interview rather than requiring in-person testimony, (f) a visual recorded examination of the witness recorded at an earlier point in the process than the trial, (g) examination of the witness through an intermediary appointed by the court to assist the witness to give their evidence at court (such intermediaries can also provide communication assistance in the investigation stage), (h) aids to communication to enable a witness to give best evidence whether through a communicator or interpreter, or through a communication aid or technique, (i) child or other dependent care, (j) transport and/or escort to and from the courtroom by police officers or other authority figures, (k) medical care, (l) mobility assistance, and/or (m) therapist or other emotional support.

The example scenario of FIG. 5 provides an overview of an interaction between a law enforcement facilitator and such a VA system. In a first step, the officer accesses a computing device to start the process. The facilitator launches the VA application (herein labeled "Smart Forms") in second step 510, and is shown a secure login screen in an optional third step 512. In this case, the facilitator is required to provide facial authentication to login. Once authenticated, the application provides the facilitator with selectable options (e.g., a menu) in a fourth step 514. For example, some options may include "Select a Form", "View Frequently Used Forms", "Form Most Recently Used", "See My Saved Forms", "More Information", "Change My Settings", "Tell Me What Type of Session You Are Initiating", "Help", "Ask Me A Question", "FAQs", "Main Menu", etc. The facilitator can select a form or the system can be preconfigured to automatically direct a user to a specific form (or there is only one form). In some embodiments, as shown here, the user may be asked if they wish to begin a session or fill out a form in a fifth step 520 ("Has user selected "Fill Out the form?"). In response to this selection, the system can be configured to present the most frequently used forms in a sixth step 522.

In this case, because the facilitator is interviewing a witness to a crime, he or she can select the Witness Statement form in a seventh step 524. In response to this selection, the assistant will ask a series of questions to help guide the facilitator and ensure basic participant data for all required fields in the form are received. If the system determines that any of the responses are formatted in a manner that is incompatible with the form (eighth step 530) an error message may be displayed in a ninth step 532. If the responses are acceptable to the system, the process continues to request an audio recording of the participant in order to capture a witness statement. This speech is converted to text in a tenth step 534.

In an eleventh step 536, any additional questions related to the scenario (i.e., witnessing a crime, and in some cases, questions directed to the specific crime that occurred) are asked and answers relayed to the virtual assistant in twelfth step 540. Some example input types or questions include: (1) witness name; (2) witness address; (3) gender; (4) age; (5) occupation; (6) education; (7) whether the witness has previously given a statement; (8) the witness' willingness to attend court and testify; (9) the court address where the witness would need to attend; (10) whether the witness has a disability; (11) authorization to access medical records of witness; (12) sexual orientation, and other such input. Based on user inputs, the virtual assistant will perform predictive analysis to provide guidance on difficult questions, such as "What kind of support can be provided to make sure the witness appears in court?" (i.e., what special measures would be suitable in this type of case, discussed in greater detail above) in a thirteenth step 542. With the vast knowledge available to the VA, an intelligent recommendation, including suggestion of one or more special measures applicable to the current witness, can be displayed to the officer. In fourteenth step 544, the interface can redirect the user to validate the inputted details and request witness consent and/or approval of the information. In some embodiments, at a fifteenth step 546, which may occur prior to, in parallel with, or after other steps, an emotion analysis is performed on the recorded witness statement. The insights from this analysis can be presented to the officer and/or be used to help determine guidance to the officer. An automatically generated PDF can be generated and presented to the officer in a sixteenth step 548. As noted earlier with respect to FIG. 3, the witness information can be extracted and disseminated back to the knowledge base in seventeenth step 550, ending the process at eighteenth step 560 for reference during subsequent interviews.

For purposes of clarity, an illustration of a witness interview is depicted with reference to FIGS. 6 and 7. In FIGS. 6 and 7, a police officer 610 interacts with a witness 620 at a crime scene 600. The police officer 610 has a portable computing device ("device") 630, here a mobile phone, from which he is accessing the virtual assistant application. In other words, although the officer is working alone, he can rely on the virtual assistant to ensure he captures the necessary information and remains abreast of the participant's emotional and personal context that can significantly affect and shape such interactions. An expanded view of a display 650 of the device 630 is also shown in FIG. 6. The display 650 is currently presenting an application interface 652 in which a speech emotional analysis graph ("graph") 660 is displayed for the officer's review. In this example, the graph 660 is a spectrum graph (amplitude over time) of some or all of the audio recording of the witness' statement taken during the interview. The recording was segmented into four utterance audio segments ("segments"), including a first utterance 652, a second utterance 654, a third utterance 656, and a fourth utterance 658. Each utterance has been tagged or labeled with the emotional state that the utterance was associated with as determined by the system (see FIG. 4). In this case, the first utterance 652 is tagged "Calm", the second utterance 654 is tagged "Angry", the third utterance 656 is tagged "Angry", and the fourth utterance 658 is tagged "Angry." In some embodiments, the percent with which the system is confident of its emotional assessment can also be shown. Other possible labels can include happy, worried, amused, excited, upset, sad, despondent, frustrated, etc. as configured by the user settings or default system settings.

Below the graph 660, an information panel 670 presents further potentially useful classifications of the witness' demeanor. In this example, the panel includes categories such as (1) Temper ("Medium"); (2) Mood ("Angry"); (3) Energy ("Neutral"); (4) Mood Groups ("Creative, Passionate"); (5) Composite ("Confident"); (6) Analysis ("According to the analysis done on witness statement, our model predicts the emotion of the speaker was 'Angry' most of the time. The details of emotion throughout the witness statement can be seen from the audio waveplot"); and (7) Emotion (symbol, icon, or quick-graphic representing the emotional state). These types of insights can be of great use to officers and add to their sense of confidence as they communicate with witnesses, particularly in real-world settings where discriminating personal observations may be challenging in a distraction prone environment.

FIG. 7 continues the example of FIG. 6, where the expanded view of display 650 is now presenting a series of form-related queries via application interface 652. In this example, the interface is an interactive questionnaire survey 750 with easy-to-select radio button options under each question for expediting the input of data. In other embodiments, any other type of selectable option mechanism or voice or text entry may be used to provide responses. In FIG.

7, a first query 752 asks "Does the witness wish to make a statement at this time? (Yes/No)". In some embodiments, selection of and submission of a Yes option can initiate a command to open a new window or switch to a recording interface for initiating an audio recording. A second query 754 asks "Does the witness require a Special Measures Assessment as a vulnerable or intimidated witness? (Yes/No)". As described above, in some embodiments, the witness may present with conditions or other signs which would benefit from a special measure. In cases where the officer is unsure, he or she may select and submit the Yes option to be navigated to a new interface where additional information or guidance about how to evaluate whether a person may have special needs.

A third query 756 asks "Is the witness willing to attend court? (Yes/No)" which may represent the target goal of the interview. In cases where the answer to the desired target goal is Yes, the system may not be required to present further recommendations. However, as shown here, selection and submission of a No option, the system may automatically initiate a process in which the inputted information is directed to an intelligent recommendation model, as described above. A fourth query 758 asks "Does the witness have any of these needs?" followed by an array of selectable options 760 including "Disability, HealthCare, Childcare, Transport, and None"). As shown in FIG. 7, the application interface 652, in response to submission of the survey form, automatically generates and presents an intelligent recommendation message 770 ("In the past, witnesses who have seen similar crimes and have similar profiles have felt most comfortable appearing in court when escorted in a police car accompanied by two officers.") The message can, for example, identify a specific course of action that is adapted to meet the needs of the first participant. The officer 610 can then confidently communicate this offer to the witness 620, in a manner that best suits the situation, thereby improving the likelihood of witness attendance in court. In some embodiments, the application interface 652 can further include a chat or message box for entering text directly into the application. For example, the officer may type questions to the VA, make requests for other forms or menu options, or enter other notes or data about the participant to add to the record that will be generated for the current interview.

Figure 8:
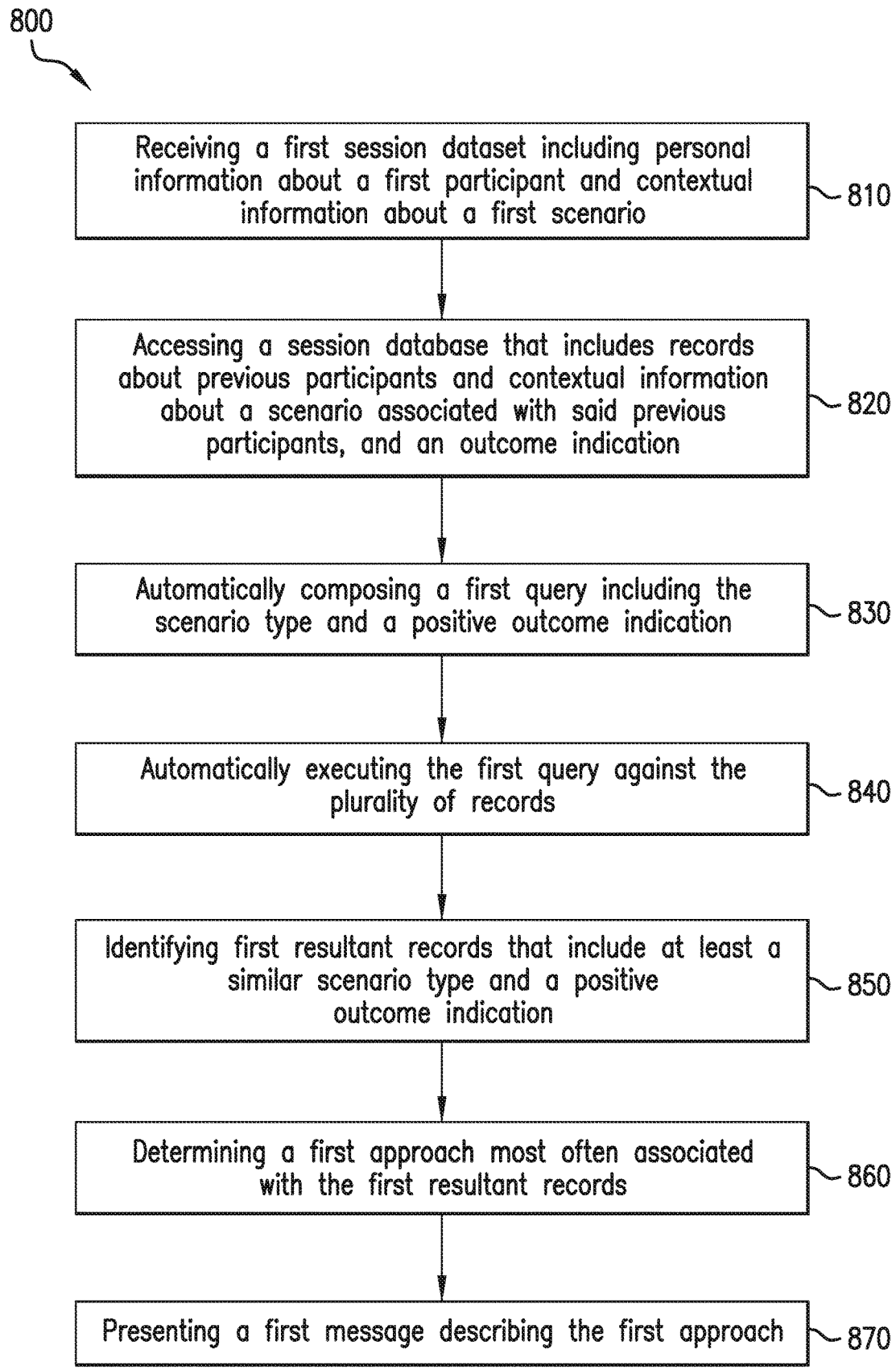
FIG. 8 is a method of providing intelligent recommendations to a facilitator for encouraging involvement by a participant in an activity session, according to an embodiment.

FIG. 8 is a flow chart illustrating an embodiment of a method 800 of providing intelligent recommendations to a facilitator with the intent of encouraging, fostering, reinforcing, and/or motiving a particular type of involvement (target goal) by a participant in an activity session. In a first step 810, the method includes receiving, at a computing device and during a first activity session, a first session dataset that includes both personal information about a first participant, as well as contextual information about a first scenario associated with the first participant that includes a scenario type. The scenario type can be a preprogrammed classification for the organization or agency utilizing the VA system, and sometimes can trigger an automated presentation of likely corresponding target goals associated with the chosen scenario type. For example, "witness to a crime", "victim of a crime", "relative of a victim", may be example scenario types for a law enforcement agency. As another example, "treatment compliance", "diet agreement", "prescription education class attendance", "elder care management" may be example scenario types for a health care organization. As yet another example, "class attendance", "homework completion", "exam preparation" may be example scenario types for an educational organization.

In a second step 820, the method includes accessing a session database, where the session database includes a plurality of records. Each record includes personal information about a previous participant of an activity session, contextual information about a scenario associated with said previous participant, and an outcome indication (e.g., positive/successful, negative/unsuccessful) for their activity session. A third step 830 involves automatically composing a first query that includes at least the scenario type of the first scenario and a positive outcome indication, and a fourth step 840 includes automatically executing the first query against the plurality of records. A fifth step 850 includes identifying, based on the first query, first resultant records that include at least a similar scenario type and a positive outcome indication. In a sixth step 860, the method includes determining at least a first approach (or strategy, process, action, event, special measure, incentive, etc.) most often associated with or most frequently occurring in the first resultant records, and a seventh step 870 of presenting, via a display associated with the computing device, a first message describing the first approach.

In other embodiments, the method may include additional steps or aspects. In one embodiment, the first session dataset further includes an audio recording of one or more utterances spoken by the first participant during the first activity session. In such cases, the method can further include detecting a speech signal in the audio recording corresponding to the one or more utterances, recognizing at least a first emotional state in the speech signal based on an analysis of acoustic characteristics in the audio recording, and presenting, via the display, a visual representation of the audio recording with a label identifying the first emotional state. In another example, each record of the plurality of records further includes an emotional assessment of the past participant during their activity session, the first query also includes the first emotional state, and/or the first resultant records each include a label corresponding to the first emotional state.

In some embodiments, the method also includes steps of determining, based on the first session dataset, that the participant is associated with a condition for which a first accommodation can be offered, and the message includes a recommendation to offer the first accommodation to the first participant. In some other embodiments, the method can include presenting, via the display and based on the first session dataset, a recommended form for use by the facilitator, receiving, from the facilitator, a first user input for selecting the recommended form, and automatically filling at least some of fields included on the recommended form with information obtained from the first session dataset. In one example, the method may further involve automatically generating a printable version of a form that presents the information corresponding to the first session dataset.

In some examples, the method also includes receiving, from the facilitator, a first outcome indication regarding the first activity session that is either positive or negative, and storing the first session dataset and the first outcome indication as an additional record in the plurality of records of the session database. As another example, the method may include receiving, at the computing device and during a second activity session, a second session dataset including (a) personal information about a second participant and (b) contextual information about a second scenario associated with the second participant that includes the scenario type, automatically composing a second query that includes at least the scenario type of the second scenario and a positive outcome indication, automatically executing the second query against the plurality of records, identifying, based on the second query, second resultant records that include at least a similar scenario type and a positive outcome indication, determining at least a second approach most often associated with the second resultant records that differs from the first approach, and presenting, via the display, a second message describing the second approach.

In some embodiments, the personal information includes one or more demographic data features, while in another embodiment, the facilitator is a law enforcement officer and the activity session refers to an interview being conducted by the officer about an incident in which the first participant was a witness.

Other methods can also be contemplated within the scope of this disclosure. For example, a method of providing guidance to a facilitator based on an emotional assessment of a participant during an activity session may be provided, including the steps of receiving, at a computing device, an audio recording of one or more utterances spoken by a current participant during an activity session, and detecting a speech signal in the audio recording corresponding to the one or more utterances. The method also includes recognizing a first emotional state in a first segment of the speech signal based on an analysis of its acoustic characteristics, and accessing a session database, the session database including a plurality of records, each record including an emotional assessment performed of an audio recording for a different participant during a previous activity session and an outcome indicator for said activity session. The method further includes automatically composing a first query that includes at least the first emotional state and a positive outcome indication, automatically executing the first query against the plurality of records, and identifying, based on the first query, first resultant records that include at least a similar emotional state and a positive outcome indication. Furthermore, the method includes determining at least a first approach most often associated with the first resultant records, and presenting, via a display associated with the computing device, a message describing the first approach.

In some cases, the method also includes presenting a visual representation of the audio recording with a label identifying the first emotional state. In some other cases, the method further includes recognizing a second emotional state in a second segment of the speech signal, and presenting a visual representation of the audio recording with a first label identifying the first emotional state proximate to the first segment and a second label identifying the second emotional state proximate to the second segment.

In some embodiments, recognizing the first emotion state in the speech signal is based on attributes of the audio recording including pitch, intonation, loudness, and/or rate of speech, and in another embodiment, the audio recording is generated during the activity session. In another example, the method may further include automatically transcribing the audio recording to text representing the one or more utterances, and storing the text in the session database in a new record generated for the current participant.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of providing intelligent recommendations to a human facilitator for fostering involvement by a human participant in a conversation session, the method comprising:
receiving, at a computing device associated with the human facilitator and during a first conversation session occurring between the human facilitator and a first human participant, a first session dataset including:
personal information regarding the first human participant,
contextual information regarding a first scenario associated with the first human participant that includes a scenario type, and
an audio recording of one or more utterances spoken by the first human participant during the first conversation session;
accessing a session database, the session database including a plurality of records, wherein each record includes personal information regarding a past human participant of a conversation session other than the first human participant, contextual information regarding a scenario associated with said past human participant, an approach during said conversation session that describes a strategy, and an outcome indication for their conversation session;
automatically composing a first query that includes the scenario type of the first scenario and a positive outcome indication;
automatically executing the first query against the plurality of records;
identifying, based on the first query, a first set of resultant records that include a similar scenario type and a positive outcome indication;
identifying a first approach that most frequently occurs in the first set of resultant records;
presenting, via a display associated with the computing device, a first message describing the strategy of the first approach;
detecting a speech signal in the audio recording corresponding to the one or more utterances;
recognizing at least a first emotional state in the speech signal based on an analysis of acoustic characteristics in the audio recording; and
presenting, via the display, a visual representation of the audio recording with a label identifying the first emotional state for review by the human facilitator, wherein recognizing the first emotional state in the speech signal is based on attributes of the audio recording including pitch, intonation, loudness, and rate of speech.

2. The method of claim 1, wherein:
each record of the plurality of records further includes an emotional assessment of the past human participant during their conversation session,
the first query also includes the first emotional state, and
each record of the first set of resultant records includes a label corresponding to the first emotional state.

3. The method of claim 1, further comprising determining, based on the first session dataset, that the first human participant is associated with a condition for which a first accommodation is available, wherein the first message includes a recommendation to the human facilitator to offer the first accommodation to the first human participant.

4. The method of claim 1, further comprising:
presenting, via the display and based on the first session dataset, a recommended form for use by the human facilitator;

receiving, from the human facilitator, a first user input for selecting the recommended form; and automatically filling one or more fields included on the recommended form with information obtained from the first session dataset.

5. The method of claim 1, further comprising automatically generating a printable version of a form that presents the personal information corresponding to the first session dataset.

6. The method of claim 1, further comprising:

receiving, from the human facilitator, a first outcome indication regarding the first conversation session that is either positive or negative; and storing the first session dataset and the first outcome indication as an additional record in the plurality of records of the session database.

7. The method of claim 6, further comprising:

receiving, at the computing device and during a second conversation session, a second session dataset including:

personal information regarding a second human participant, contextual information regarding a second scenario associated with the second human participant that includes the scenario type;

automatically composing a second query that includes the scenario type of the second scenario and a positive outcome indication;

automatically executing the second query against the plurality of records;

identifying, based on the second query, a second set of resultant records that include a similar scenario type and a positive outcome indication;

identifying a second approach that most frequently occurs in the second set of resultant records that differs from the first approach; and presenting, via the display, a second message describing the second approach.

8. The method of claim 1, wherein the personal information includes one or more demographic data features.

9. The method of claim 1, wherein the human facilitator is a law enforcement officer and the conversation session refers to an interview being conducted by the law enforcement officer regarding an incident in which the first human participant was a witness.

10. The method of claim 3, wherein the condition refers to the first human participant being one of a racial or ethnic minority, a child, a victim of specific types of crimes, socioeconomically disadvantaged, elderly, underinsured, and someone for whom access to education is limited.

11. The method of claim 3, wherein the condition refers to the first human participant having a disability.

12. The method of claim 3, wherein the first accommodation described in the first message is a provision to help a vulnerable and/or intimidated witness give evidence in a courtroom.

13. The method of claim 12, wherein the first accommodation is described in the first message as an offer to provide one of a screen in the courtroom to shield the witness from a defendant, and a live link to enable the witness to give evidence during a trial from outside the courtroom through a visual link to the courtroom.

14. The method of claim 12, wherein the first accommodation is described in the first message as an offer made by the human facilitator to the human participant for one of a visual recorded interview rather than in-person testimony, an examination of the witness through an intermediary appointed by a court to assist the witness, and transportation to and from the courtroom.

15. The method of claim 3, wherein the first accommodation is described in the first message as an offer made by the human facilitator to the human participant for one of medical care, mobility assistance, therapy or other emotional support, an interpreter, and child or other dependent care.

16. A system for providing intelligent recommendations to a human facilitator for fostering involvement by a human participant in a conversation session, the system comprising a processor and machine-readable media including instructions which, when executed by the processor, cause the processor to:

receive, at a computing device associated with the human facilitator and during a first conversation session occurring between the human facilitator and a first human participant, a first session dataset including:

personal information regarding the first human participant, contextual information regarding a first scenario associated with the first human participant that includes a scenario type, and an audio recording of one or more utterances spoken by the first human participant during the first conversation session;

access a session database, the session database including a plurality of records, wherein each record includes personal information regarding a past human participant of a conversation session other than the first human participant, contextual information regarding a scenario associated with said past human participant, an approach during said conversation session that describes a strategy, and an outcome indication for their conversation session;

automatically compose a first query that includes the scenario type of the first scenario and a positive outcome indication;

automatically execute the first query against the plurality of records;

identify, based on the first query, a first set of resultant records that include a similar scenario type and a positive outcome indication;

identify a first approach that most frequently occurs in the first set of resultant records;

present, via a display associated with the computing device, a first message describing the strategy of the first approach;

detect a speech signal in the audio recording corresponding to the one or more utterances;

recognize at least a first emotional state in the speech signal based on an analysis of acoustic characteristics in the audio recording; and present, via the display, a visual representation of the audio recording with a label identifying the first emotional state for review by the human facilitator, wherein recognizing the first emotional state in the speech signal is based on attributes of the audio recording including pitch, intonation, loudness, and rate of speech.

17. The system of claim 16, wherein:

each record of the plurality of records further includes an emotional assessment of the past human participant during their conversation session, the first query also includes the first emotional state, and each record of the first set of resultant records includes a label corresponding to the first emotional state.

18. The system of claim 16, wherein the instructions further cause the processor to determine, based on the first session dataset, that the first human participant is associated with a condition for which a first accommodation is available, wherein the first message includes a recommendation to offer the first accommodation to the first human participant.

19. A system comprising one or more computers and one or more storage devices storing instructions that are operable, when executed by the one or more computers, to cause the one or more computers to:
    receive, at a computing device associated with a human facilitator and during a first conversation session occurring between the human facilitator and a first human participant, a first session dataset including:
        personal information regarding the first human participant,
        contextual information regarding a first scenario associated with the first human participant that includes a scenario type, and
        an audio recording of one or more utterances spoken by the first human participant during the first conversation session;
    access a session database, the session database including a plurality of records, wherein each record includes personal information regarding a past human participant of a conversation session other than the first human participant, contextual information regarding a scenario associated with said past human participant, an approach during said conversation session that describes a strategy, and an outcome indication for their conversation session;
    automatically compose a first query that includes the scenario type of the first scenario and a positive outcome indication;
    automatically execute the first query against the plurality of records;
    identify, based on the first query, a first set of resultant records that include a similar scenario type and a positive outcome indication;
    identify a first approach that most frequently occurs in the first set of resultant records;
    present, via a display associated with the computing device, a first message describing the strategy of the first approach;
    detect a speech signal in the audio recording corresponding to the one or more utterances;
    recognize at least a first emotional state in the speech signal based on an analysis of acoustic characteristics in the audio recording; and
    present, via the display, a visual representation of the audio recording with a label identifying the first emotional state for review by the human facilitator, wherein recognizing the first emotional state in the speech signal is based on attributes of the audio recording including pitch, intonation, loudness, and rate of speech.

20. The system of claim 19, wherein:
each record of the plurality of records further includes an emotional assessment of the past human participant during their conversation session,
the first query also includes the first emotional state, and
each record of the first set of resultant records includes a label corresponding to the first emotional state.

* * * * *